3,365,270
PROCESS FOR PRODUCTION OF ALKALINE CYANIDES
Jean Guerin, Grenoble, France, assignor to Societe d'Electro-Chimie, d'Electro-Metallurgie et des Acieries Electriques d'Ugine, Paris, France, a corporation of France
Filed Mar. 26, 1964, Ser. No. 354,832
Claims priority, application France, Mar. 30, 1963, 929,876
7 Claims. (Cl. 23—79)

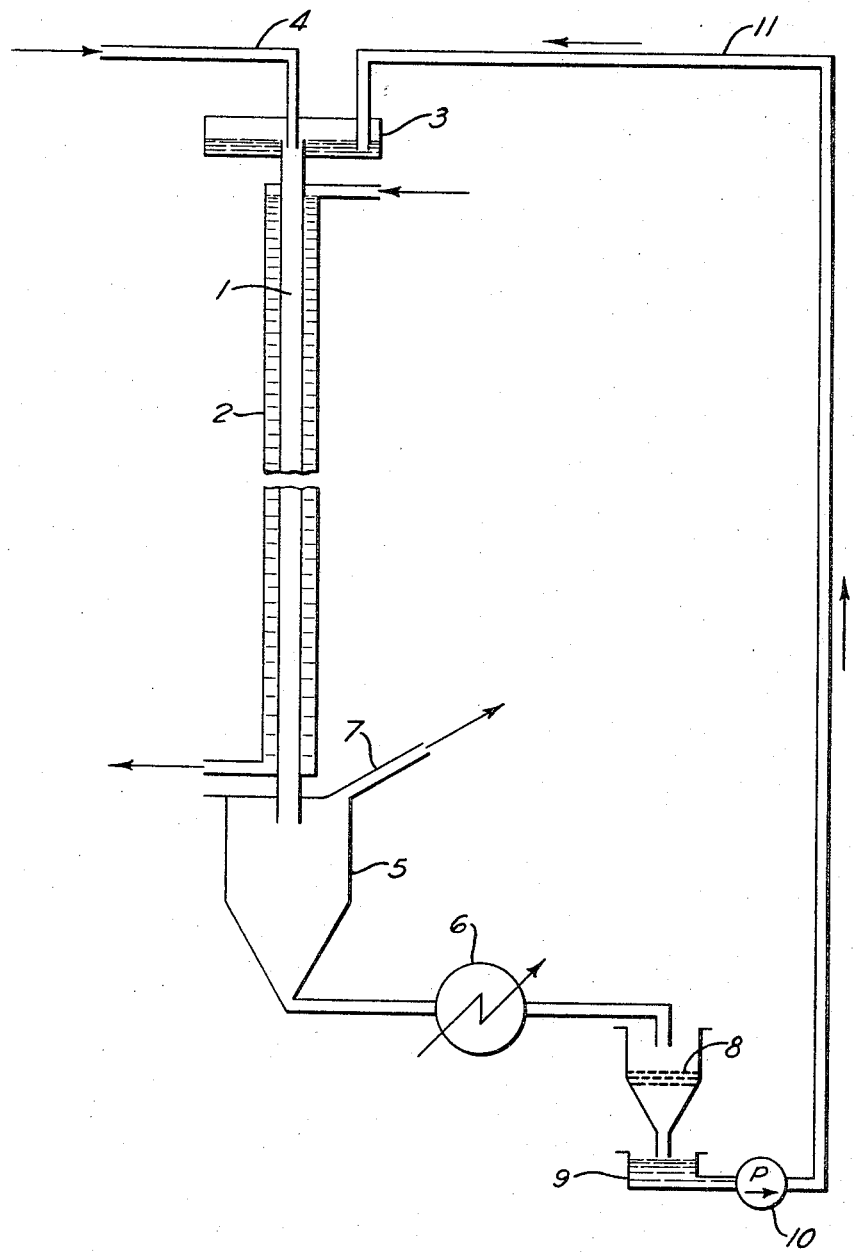

This invention relates to production of alkaline cyanides from hydrogen cyanide and more particularly to a process which uses as a source of hydrogen cyanide, complex gaseous mixtures with a relatively low content of hydrogen cyanide. The gaseous mixture is employed at temperatures below or equal to 300° C. and contains one or several compounds such as ammonia, carbon dioxide, steam, which generate problems in the production of alkaline cyanide.

Most of the prior processes for the production of alkaline cyanides from hydrogen cyanide use pure hydrogen cyanide, 99% to 100% hydrogen cyanide. Generally, this hydrogen cyanide results from a complex treatment of raw gases which treatment in most cases comprises the following steps:

Washing of the raw gases with a sulphuric acid solution to fix ammonia,

Absorption of hydrogen cyanide in cooled water,

Securing pure gaseous hydrogen cyanide by heating the aqueous solution to its boiling point.

This treatment is rather expensive because of the necessary investments for apparatus and of the cost of heating the aqueous solution and cooling the water.

It is advantageous to treat directly gaseous mixtures containing small amounts of hydrogen cyanide, but such treatment encounters a number of difficulties depending on the composition and the temperature of the gaseous mixture. Specifically, hydrogen cyanide, whether hot or cold, tends easily to polymerize in the presence of ammonia. The direct treatment of the hot gases with an alkaline solution under known conditions effects localized heatings and an important decomposition of cyanide into alkaline formate. If the difficulties due to polymerization are overcome, and if the operation is carried out when cold, substantial quantities of ammonia are dissolved which afterwards have to be separated from the solution. If there are important amounts of steam, cold absorption of the cyanide produces a condensation of the steam and an excessive dilution of the obtained solution. This renders necessary a further concentration of the solution, which is always prejudicial to the cyanide quality, in particular due to formate formation. Lastly, the presence of carbon dioxide, which is also easily absorbed by an alkaline solution, generates formation of an alkaline carbonate. The result is a complex and difficult separation problem for which, however, solutions have been proposed in U.S. Patent 2,742,344, issued April 17, 1956. In this process, the alkaline solution is neutralized by raw gases from the reaction of ammonia on a hydrocarbon in the presence of air or of oxygen, and the resulting solution contains both an alkaline cyanide and an alkaline carbonate. The separation of these two salts is effected by adding a determined quantity of a calcium cyanide solution prepared in a separate operation to the alkaline solution from the hot gas treatment. Calcium carbonate precipitates and then is eliminated by filtration.

Consequently, difficulties are encountered when there is direct utilization of raw gases, whether hot or cold, and which contain hydrogen cyanide together with ammonia and/or carbon dioxide and/or steam to effect their reaction upon an alkaline solution. This is the case for the gases resulting from a synthesis process for production of hydrogen cyanide, an endothermic process, in which ammonia is a primary inconvenient impurity. It is also the case for the gases resulting from formamide decomposition, which gases contain steam and ammonia as primary inconvenient impurities. The difficulties are even greater when the gases are hot and at the same time contain ammonia, carbon dioxide and steam, which is the case for the raw gases resulting from a reaction of ammonia on a hydrocarbon in the presence of air or oxygen. Such a reaction is an exothermic one.

In U.S. Patent 2,747,962 which utilizes gas mixtures of acidic constituents it is preferred to operate at or near room temperature, because temperatures much above atmospheric favor a disproportionately high absorption of carbon dioxide. In fact, because of polymerization of hydrogen cyanide, it is impossible to operate at or near room temperature with raw gases resulting from a synthesis process for production of hydrogen cyanide which comprises a basic constituent as ammonia.

My invention relates to a process for production of alkaline cyanides as a high purity solution by direct treatment of an alkaline solution with raw gases which are hot and contain, in addition to a relatively small amount of hydrogen cyanide and ammonia, carbon dioxide and/or steam and inert gases. The alkaline cyanides thus prepared are sodium and potassium cyanides mainly. The hydrogen cyanide content of the raw gases is generally below 40% by volume.

I have found reaction conditions in which polymerization and absorption of water and/or ammonia are avoided, and in which the absorption speed of hydrogen cyanide by an alkaline solution is much higher than the absorption speed of carbon dioxide by the same solution and than the formation speed of formate from cyanide in the same solution.

According to my invention, the gases are introduced at a temperature between 100° C. and 300° C. in apparatus which produces parallel film flows of an alkaline solution which may contain cyanide. The temperature of the solution is between 60° C. and 90° C. and may require cooling to avoid exceeding 90° C. The final temperature of the gases is near that of the solution and the maximum contact time of the gases with the solution is 2 or 3 seconds, preferably below one second. The contact time of the solution with the gases is a few seconds. The "contact time" of the gases with the solution is that time during which a definite elemental volume of gas passes through the reaction zone where it is in contact with the solution. Likewise, the "contact time" of the solution with the gas is the time during which a definite elemental volume of solution passes through the reaction zone where it is in contact with the gases. The reaction zone, of course, is fixed. However, the flow speeds of the gases and of the solution within the reaction zone are different and, therefore, the "contact times" of the gases and of the solution are different.

The apparatus for generating the film flows includes any apparatus which effects the contact times and in which the absorbing solution is present as a thin film flowing along a cooled wall. Tubular devices in which the solution as a thin film progresses along the inner walls of tubes and in which the gases flow inside the tubes, are examples of devices which can be utilized to practice the process. In these apparatus, the thickness of the film flow is generally below 2 mm. and preferably comprised between 0.2 and 1 mm.

The alkaline solution may be introduced into the apparatus at any temperature; however, it is advantageous to introduce it at room temperature to improve the cyanide quality and to limit costs of cooling same. During its progression through the apparatus, the alkaline solution warms up due to the absorption of the sensible heat of the gases and to the heat emitted by the reaction between the gases and the alkaline solution. Nevertheless, the temperature of the solution as it exits from the apparatus must be below 90° C. and, for that purpose, provision for cooling the solution is made. Among the temperatures below 90° C., it is preferable to choose those at which the vapor tension of the solution is at least equal to the partial pressure of the steam in the gases in a zone where the gases and alkaline solution are contacted and the reaction takes place. Besides, it is advantageous to rapidly cool down the solution as it exits from the reaction zone.

The gases are introduced into the apparatus at the temperature at which they are available, and there is no inconvenience when that temperature is around 300° C. The gases are discharged at a temperature near to that of the alkaline solution as it exits from the absorption apparatus.

The contact time of the gases with the alkaline solution must be very short, and must not exceed 2 or 3 seconds. Generally, it is preferable that it should be a fraction of a second, particularly if the gases contain a notable amount of carbon dioxide.

The contact time of the solution with the gases may be a little longer, and may reach several seconds, for instance 5 or 6 seconds. However, a shorter time is preferred if the gases contain a notable amount of carbon dioxide.

The alkaline solution contains free hydroxide of the metal whose cyanide is desired. It may initially contain cyanide, and its cyanide concentration increases as it progresses through the absorption apparatus. The hydroxide concentration is not critical, so that both a discontinuous and a continuous practice of the process can be carried out.

In discontinuous practice of the process, the initial solution is strongly alkaline, and, of course, eventually contains the alkaline cyanide. This solution passes into the absorption apparatus as many times as is necessary to leave very little free hydroxide therein and to obtain the desired concentration of cyanide. Then all or part of the contained cyanide is extracted by any known means.

In continuous practice of the process, the circulating alkaline solution used contains little hydroxide when it enters the absorption apparatus, and it reaches its minimum concentration of hydroxide in one passage through the apparatus. The alkaline cyanide crystals are separated from the whole or from a part of the solution before charging it again with hydroxide for re-use in the absorption apparatus.

Of course, in both the discontinuous and the continuous practices, neutralization of the alkaline solution is limited to a residual hydroxide content below which cyanide is decomposed. This content is near 0.2% by weight of the solution.

My process offers many advantages for it produces in one apparatus of reduced dimensions a concentrated alkaline cyanide solution from raw gases, including hot raw gases, with no substantial formation of formate. Additionally, it achieves a substantially complete absorption of hydrogen cyanide (generally above 95%), substantially no absorption of ammonia or steam, and a very low absorption of carbon dioxide. The carbonate content of the resulting solution is generally low enough for the cyanide separated as crystals to have a carbonate content which meets usual commercial requirements.

If there is a very high carbon dioxide content in the raw gases, it is possible to improve selectiveness of the process by providing a slightly lower hydrogen cyanide absorption output, such as 90%, to limit the carbonate content below a desired value. Under such circumstances, I more strictly limit the contact time between the gases and the absorption solution, while the other operating conditions remain the same.

The accompanying drawing is a schematic view of one apparatus with a single tube for carrying out the process continuously. In a multi-tubular absorption apparatus, each tube plays a similar role to that of the single tube of the apparatus shown.

Referring to the drawing, a vertical absorption column 1 has a double-walled casing 2 and an annular part 3 at its top. A tube 4 which delivers the gases to the top of the column 1 is heated and insulated to avoid condensation of steam on its walls and risks hydrogen cyanide polymerization.

An alkaline liquor or solution arrives in the annular part 3 from a pipe 11, and a liquid film along the walls of the column 1 is formed by overflowing the liquor from this annular part. The liquid film flows along the inner wall of the column 1 and the gases circulate inside this column. These gases and the liquid film circulate in parallel flows and at different speeds, and the liquid film falls into a receptacle 5 where it is separated from the gases which escape through a tube 7.

The solution collected in the receptacle 5 passes into a cooler 6 where it is cooled down to a temperature at which crystallization of an alkaline cyanide takes place in an amount corresponding to the amount formed in the column 1. The crystals are extracted from a resulting slurry in a filtering device 8, and the filtrate collected in a receiver from which a pump 10 returns it to the annular part 3 through a pipe 11 after it has been charged again with the hydroxide by devices not shown. For example, the filtrate can be recharged with the hydroxide in the receiver 9 or during its passage through the pipe 11.

The following, non-limitative examples are illustrative of my process.

EXAMPLE 1

This example relates to practice of the process in the apparatus shown in the drawing.

The absorption solution introduced into the annular part 3 at 35° C. had the following composition:

|  | G./l. |
|---|---|
| NaCN | 412 |
| NaOH | 115 |
| $Na_2CO_3$ | 7.1 |
| HCOONa | 4.8 |

The raw gases came from a synthesis furnace in which hydrogen cyanide is generated from ammonia and hydrocarbon in the presence of air, and arrived through the tube 4 at 212° C. Their initial composition by volume was:

|  | Percent |
|---|---|
| HCN | 6.7 |
| $CO_2$ | 0.55 |
| $NH_3$ | 1.9 |
| $H_2O$ | 23 |
| Various inert gases | 67.85 |

The residual gases exited from the absorption column 1 at 85° C., and their composition by volume was:

|  | Percent |
|---|---|
| HCN | 0.18 |
| $CO_2$ | 0.52 |
| $NH_3$ | 1.9 |
| $H_2O$ | 24.5 |
| Various inert gases | 72.9 |

The solution resulting from the absorption arrived in the receptacle 5 at 86° C. This solution was limpid, colorless and had the following composition at 36° C.:

|  | G./l. |
|---|---|
| NaCN | 484 |
| NaOH | 25 |
| $Na_2CO_3$ | 8.6 |
| HCOONa | 5.3 |

This solution was cooled down in the cooler 6 to 25° C.

The contact time of the gases with the liquid film was 0.1 second; that of the liquid with the gases was 4 seconds.

The above analyses, whether considering the gases or the solution, show that good results were obtained. Of course, there was an increase in volume of the solution of about 7% due to addition of the products from the reaction into the solution and this must be taken into account.

The hydrogen cyanide absorption was about 97.5%, while only 11% of the carbon dioxide in the raw gases was absorbed. The absorption of ammonia was negligible and the formation of formate was only one molecule of formate per 100 molecules of cyanide.

An examination of the apparatus after a long working period, as well as the limpidity of the obtained solutions, proved that polymerization of hydrogen cyanide had been practically avoided.

EXAMPLE 2

The process of this example was carried out as in Example 1, but with a greater cooling of the column 1 by circulation of a cooling fluid in parallel flows through the double-walled casing 2. The solution resulting from the absorption arrived in the receptacle 5 at 74° C. and had the following composition:

|  | G./l. |
|---|---|
| NaCN | 479 |
| NaOH | 24.5 |
| $Na_2CO_3$ | 8.5 |
| HCOONa | 4.8 |

This solution was limpid and colorless and its increase in volume compared to the volume of the solution supplied to the absorption column 1 was 8.5%.

A comparison of the results obtained with those of Example 1 shows that the process of Example 2 achieved the results expected from the process, but obtained some of them at a slightly different degree. The hydrogen cyanide absorption output was still 97.5% and the amount of carbon dioxide absorbed was also about 11% of the carbon dioxide present in the raw gases. The ammonia absorption was also negligible, and, likewise, the hydrogen cyanide polymerization was practically avoided. On the other hand, due to the use of a slightly lower final temperature of the solution which exited from the column 1, a very slight absorption of the steam contained in the raw gases was realized and the amount of formate formed had decreased, it was only one molecule per 360 molecules of the sodium cyanide obtained.

EXAMPLE 3

The same apparatus used in Examples 1 and 2 was utilized, and the gases arrived at the column 1 through tube 4 at 210° C. They contacted the same solution as in Example 1 for 0.2 second. The contact time of the solution with the gases was near 8 seconds. The solution which exited from the column 1 at 85° C. had the following composition at 36° C.:

|  | G./l. |
|---|---|
| NaCN | 486 |
| NaOH | 22 |
| $Na_2CO_3$ | 10.5 |
| HCOONa | 6.2 |

The solution was limpid and colorless.
The compositions of the gases employed were:

|  | Inlet | Outlet |
|---|---|---|
|  | Percent | Percent |
| HCN | 6.7 | 0.07 |
| $CO_2$ | 0.55 | 0.46 |
| $NH_3$ | 1.90 | 1.90 |
| $H_2O$ | 23 | 24.5 |
| Various inert gases | 67.85 | 73.07 |

Thus, when operating with longer (although still very short) contact times, the essential results of the process were obtained. The hydrogen cyanide absorption output had improved since it was 99%. The ammonia absorption was negligible, and the steam absorption was practically nil, as was the hydrogen cyanide polymerization.

The formate formation was about the same as in Example 1—one molecule of formate per 85 molecules of cyanide. However, a little more absorption of carbon dioxide was encountered since 22% of the amount present in the raw gases was absorbed.

EXAMPLE 4

The gases arrived at the column 1 through tube 4 at 210° C. and were contacted with a solution identical to that of the preceding examples. However, the contact time of the gases with the liquid was 0.07 second; while the contact time of the solution with the gases was near 3 seconds. The solution exited from the column 1 at 84° C. The solution from the column 1 had the following composition at 36° C.:

|  | G./l. |
|---|---|
| NaCN | 481 |
| NaOH | 24.8 |
| $Na_2CO_3$ | 8.0 |
| HCOONa | 5.4 |

The solution was limpid and colorless.
The compositions of the gases by volume at the inlet and at the outlet of the column 1 were:

|  | Inlet | Outlet |
|---|---|---|
|  | Percent | Percent |
| HCN | 6.7 | 0.36 |
| $CO_2$ | 0.55 | 0.54 |
| $NH_3$ | 1.9 | 1.9 |
| $H_2O$ | 23 | 24.5 |
| Various inert gases | 67.85 | 72.7 |

The increase in volume of the solution was 7%.

Although the contact times had been substantially reduced, the essential results expected from the process were obtained. The hydrogen cyanide absorption output, while a little lower than in the previous examples, was still 95%. The carbon dioxide absorption was very slight, less than 8% of the amount present in the raw gases, and the water and the ammonia absorption was practically negligible, as was the hydrogen cyanide polymerization. The formate formation was very low: one molecule per 145 molecules of cyanide.

EXAMPLE 5

The same apparatus as in the previous examples was utilized and the column 1 was supplied with a solution at 35° C. of the following composition:

|  | G./l. |
|---|---|
| NaCN | 406 |
| NaOH | 122 |
| $Na_2CO_3$ | 3.8 |
| HCOONa | 4.5 |

The gases used had the following compositions by volume:

|  | Inlet | Outlet |
|---|---|---|
|  | Percent | Percent |
| HCN | 19.5 | 0.7 |
| $NH_3$ | 6.5 | 7.1 |
| Various inert gases | 74 | 92.2 |

The solution exited from the column 1 at 68° C. and had the following composition at 36° C.:

|  | G./l. |
|---|---|
| NaCN | 502 |
| NaOH | 10.2 |
| $Na_2CO_3$ | 3.5 |
| HCOONa | 4.8 |
| $NH_3$ | 0.1 |

The solution was limpid and colorless, and the increase in its volume was 8%. This solution was cooled down in the cooler 6 to 25° C.

The hydrogen cyanide absorption was 97.1%. A very small ammonia absorption was encountered; but the hydrogen cyanide polymerization was practically nil. Also, the formate formation was very low, i.e., one molecule of formate was formed per 277 molecules of cyanide.

EXAMPLE 6

The same apparatus as in the previous examples was utilized and the column 1 was supplied with a solution at 35° C. of the following composition:

|  | G./l. |
|---|---|
| KCN | 326 |
| KOH | 171 |
| $K_2CO_3$ | 4.1 |
| HCOOK | 4.2 |

The gases used had the following compositions by volume:

|  | Inlet | Outlet |
|---|---|---|
|  | Percent | Percent |
| HCN | 19.5 | 0.8 |
| $NH_3$ | 6.5 | 7.6 |
| Various inert gases | 74 | 92.2 |

The solution exited from the column 1 at 71° C. and was cooled down to 30° C. The solution had the following composition:

|  | G./l. |
|---|---|
| KCN | 475 |
| KOH | 9.4 |
| $K_2CO_3$ | 4.0 |
| HCOOK | 4.5 |
| $NH_3$ | 0.1 |

The solution was limpid and colorless. The increase in its volume was 8%. The hydrogen cyanide absorption was 96.7%. A small ammonia absorption was encountered; but the hydrogen cyanide polymerization was practically nil and the formate formation was very low, i.e., one molecule of formate was formed per 322 molecules of cyanide.

While I have shown and described preferred embodiments of my invention, it may be otherwise embodied within the scope of the appended claims.

I claim:

1. A process for the production of alkaline cyanides from hot raw gases having a temperature within the range of 100° C. to 300° C. containing a relatively small amount of hydrogen cyanide and in addition ammonia and other gases such as carbon dioxide, steam and inert gases which comprises,
    (A) forming a flowing film having a maximum thickness of about 2 mm. of an alkaline solution containing free hydroxide of the alkali metal whose cyanide is to be produced,
    (B) contacting said flowing film with said hot raw gases,
    (C) regulating the rate of flow of the hot gases and of the solution so that the maximum contact time of said solution with said gases is substantially 8 seconds and the maximum contact time of said gases with said solution is substantially 3 seconds,
    (D) controlling the temperature of the solution during contact with the hot gases so that at the end of the contact time of the solution with said gases the maximum temperature of the solution is 90° C. and the gas temperature is near the temperature of the solution,
    (E) cooling the solution after contact between said hot gases and said solution to crystallize alkaline cyanide, and
    (F) separating alkaline cyanide crystals from said cooled solution.

2. A process as described in claim 1 in which the alkaline cyanide crystals are separated from said cooled solution by filtering, and wherein hydroxide of the alkali metal whose cyanide is to be produced is added to the filtrate and the filtrate is returned to said flowing film.

3. A process as described in claim 1 in which the preferred thickness of the flowing film of solution is between 0.2 and 1 mm.

4. A process as described in claim 1 in which said solution is at ambient temperature prior to the formation of said film.

5. A process as described in claim 1 in which said solution is cooled during contact with said hot gases.

6. A process as described in claim 1 in which the temperature of the solution after contact with the hot gases ranges from 60° C. to 90° C.

7. A process as described in claim 1 characterized by controlling the temperature of the solution such that the vapor tension of the solution is equal to the partial pressure of the steam in the hot gases in the zone where the gases and alkaline solution are in contact.

References Cited

UNITED STATES PATENTS

| 1,609,038 | 11/1926 | Olberg | 23—79 X |
| 2,742,344 | 4/1956 | Inman et al. | 23—79 |
| 2,747,962 | 5/1956 | Heitz et al. | 23—2 |
| 3,079,239 | 2/1963 | McLane | 23—79 X |

FOREIGN PATENTS

| 858,844 | 1/1961 | Great Britain. |

OTHER REFERENCES

A.P.C. application of Pflock, Serial No. 419,235, published May 1943.

EDWARD J. MEROS, *Primary Examiner.*

OSCAR R. VERTIZ, *Examiner.*

B. H. LEVENSON, J. J. BROWN, *Assistant Examiners.*